Nov. 17, 1970    A. PEYER    3,541,427
DIRECT FREQUENCY CHANGER ARRANGEMENT
Filed June 24, 1968

INVENTOR.
ARTHUR PEYER
BY
McGlew & Toren
ATTORNEYS

United States Patent Office 3,541,427
Patented Nov. 17, 1970

3,541,427
DIRECT FREQUENCY CHANGER ARRANGEMENT
Arthur Peyer, Otelfingen, Switzerland, assignor to Maschinenfabrik Oerlikon, Zurich, Switzerland
Filed June 24, 1968, Ser. No. 739,361
Claims priority, application Switzerland, June 27, 1967, 9,278/67
Int. Cl. H02m 5/30
U.S. Cl. 321—69    10 Claims

ABSTRACT OF THE DISCLOSURE

A direct frequency changer arrangement or direct converter arrangement, comprises at least three partial frequency changers or partial converters, having internal windings and controllable valves. The partial frequency changers or converters are connected in series by conductors which are connected with internal windings of the partial frequency changers. The partial frequency changers or converters may be in phase with each other or may be at least partially out of phase with each other.

BACKGROUND OF THE INVENTION

Known frequency changers are of two types, namely intermediate circuit frequency changers and direct frequency changers. Direct frequency changers are superior to intermediate circuit frequency changers in many respects, particularly in the case of low frequencies. However, while high pulse numbers can be attained in intermediate circuit frequency changers without using interphase transformers and only one smoothing choke, corresponding symmetrical circuits of direct frequency changers have not hitherto been known.

Frequency changers are generally classified as converters and, in this respect, are A.C. to A.C. converters rather than A.C. to D.C. converters, such as straight rectifiers. Known phase and frequency converters are of two types, namely the intermediate circuit converters and director converters. The main difference between these two types is that the conversion, in direct converters, can be obtained directly without an intermediate stage comprising a D.C. circuit, which latter is required in intermediate circuit converters. By the term "partial frequency changer" or "partial frequency converter," as used hereinafter, is meant a rectifier-inverter of the half-wave configuration, as compared to a full-wave configuration. Thus, one well known form of partial converter is a half-wave rectifier, which can be compared to a well known form of full converter which is a full-wave rectifier.

Known circuits of direct frequency changers or frequency converters, with interphase transformers, have the same disadvantages as corresponding converters, such as valve converters, interconnecting an A.C. system and a D.C. system. These disadvantages are namely the interphase-transformer-break, the unsymmetrical loading and high costs. Although direct frequency changers or frequency converters having high pulse numbers and omitting interphase transformers have already been described, these are unsymmetrical and permit only an operation controlled by the primary mains or supply circuits. Thus, the primary mains control the secondary side, and the secondary frequency is limited to a fraction of the primary frequency.

A known form of direct converter is a symmetrical direct converter in which each valve belongs to both a primary A.C. to D.C. converter and a secondary A.C. to D.C. converter. The operation of frequency changers and the control method of such direct converters are well known, and have been described in many articles, including the following:

(1) Alexanderson, E. F. W. and Mittag, A. H.: "The Thyratron Motor," Trans. Amer. IEE 53 (1934), pp. 1517–1523.
(2) Beiler, A. H.: "The Thyratron Motor at the Logan Plant," Electr. Eng. 57 (1937), pp. 13–24, Zusammenfassung: ETZ 59 (1938), p. 427.
(3) Willis, C. H.: "A Study of the Thyratron Commutator Motor," Gen. Electr. Rev. 36 (1933), p. 76.

SUMMARY OF THE INVENTION

This invention relates to direct frequency changers or converters and, more particularly, to a novel and improved direct frequency changer or converter arrangement which is symmetrical.

The objective of the invention is to provide higher-pulsed circuits of direct frequency changers without interphase transformers, and in which the secondary frequency is independent of the primary frequency. In accordance with the invention, this objective is attained by providing at least three partial symmetrical frequency changers or converters connected in series through conductors which are connected with the internal windings of the partial frequency changers. The advantages of the invention arrangement include the attaiment of high-pulse numbers without interphase transformers, and with only a single storage choke, if necessary.

An object of the invention is to provide an improved direct frequency changer arrangement.

Another object of the invention is to provide a direct frequency changer arrangement by which high-pulse numbers can be attained without the use of interphase transformers.

A further object of the invention is to provide such a direct frequency changer arrangement requiring, at the most, only a single storage choke.

Still, another object of the invention is to provide a direct frequency changer arrangement in which the secondary frequency is independent of the primary frequency.

A further object of the invention is to provide such a direct frequency changer arrangement including at least three partial symmetrical frequency changers or converters connected in series by conductors which are connected with the internal windings of the partial frequency changers.

For an understanding of the principles of the invention, reference is made to the following description of typical embodiments thereof as illustrated in the accompanying drawings.

DESCRIPTION OF THE PREFERRED EMBODIMENTS

Figure 1:
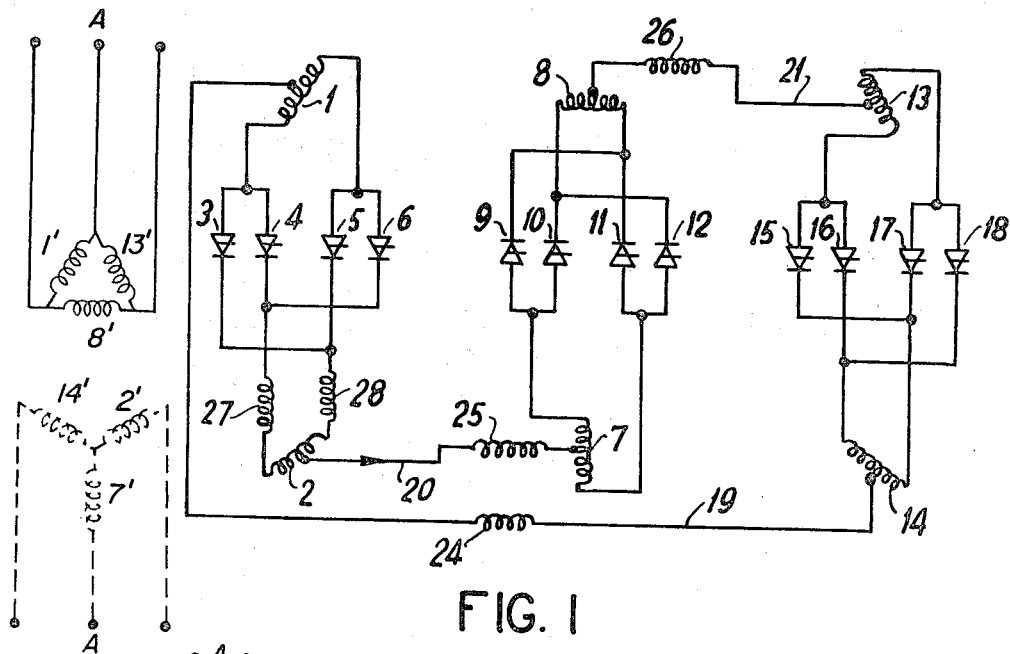
FIG. 1 is a schematic wiring diagram illustrating three partial symmetrical frequency changers or converters connected in series with each other, with the partial frequency changers not being in phase with each other.

Referring to FIG. 1, one of three interconnected partial symmetrical direct frequency changers or converters comprises an internal winding 1 of a primary circuit and an internal winding 2 of a secondary circuit. The respective external windings, which can be transformer windings connected to mains of different frequencies, are not specifically illustrated, and are omitted completely if the internal windings form part of a machine. The internal windings 1 and 2 are interconnected through controllable valves 3, 4, 5, and 6.

The components 1 through 6 represent, together with any external windings (not shown), a partial symmetrical frequency changer or converter. If the valves 3 and 5, and the valves 4 and 6, respectively, are ignited or triggered alternately and in the rhythm of the primary voltage, there is no change in the direction of current flow through the winding 2. The two pairs of valves 3, 5 and 4, 6 effect the primary commutation while, upon switching from valve 3 to valve 4 and from valve 5 to valve 6, secondary commutation is effected. Each valve therefore is included in both a primary commutation circuit and a secondary commutation circuit. Such a circuit is called "symmetrical," and the primary and secondary frequencies are independent of each other.

The components 7 through 12 represent, again together with any external windings (not shown) a second partial symmetrical direct frequency changer or converter and the corresponding components 13 through 18 represent a third partial frequency changer. In the second and third partial symmetrical direct frequency changers or converters, the primary circuit internal windings are indicated respectively at 7 and 13 and the secondary internal windings at 8 and 14. The valves are designated 9–12 in the second partial frequency changer and 15–18 in the third partial frequency changer. The midpoints of the internal windings of the partial frequency changers are connected with each other by conductors 19, 20, and 21, as illustrated in FIG. 1.

In the arrangement of FIG. 1, the partial frequency changers are differently phased. If there are in-phase conditions, simplifications of the circuit are possible, as can be seen from FIGS. 2 and 3.

Figure 2:
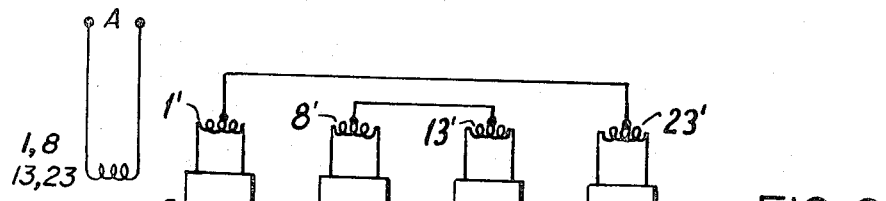
FIGS. 2 and 3 are schematic wiring diagrams illustrating modifications of the circuit shown in FIG. 1.

Referring to FIG. 2, four partial symmetrical direct frequency changers or converters I-IV are schematically illustrated in simplified form. The internal windings 1', 8', 13' and 23' are in phase, and the pairs of windings 2', 7' and 14', 22' are in-phase with each other.

Figure 3:
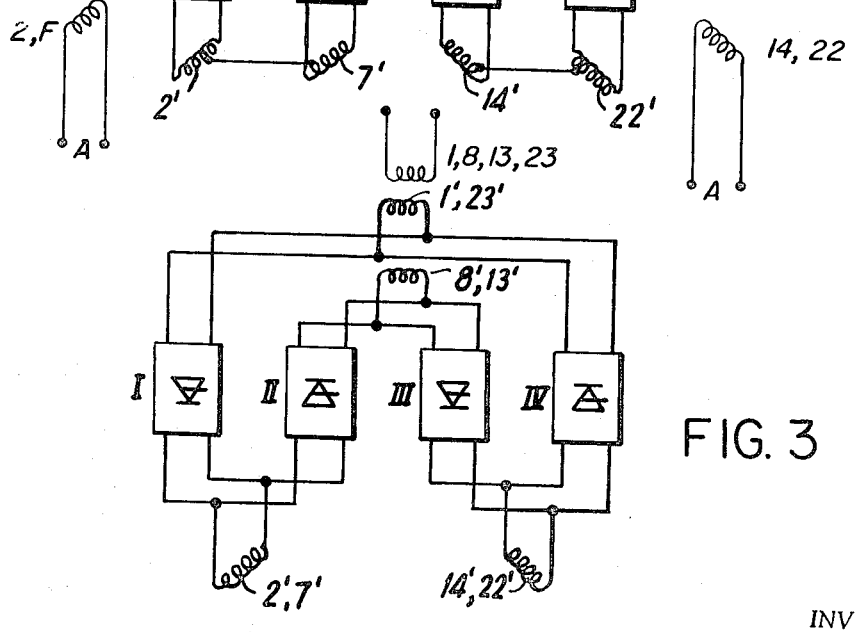

If the windings which are in phase, and whose midpoints are connected with each other and at the same frequency, are combined, the arrangement shown in FIG. 3 is obtained, wherein windings 1' and 23' are combined into one winding, windings 8' and 13' into another winding, windings 2' and 7' into a third winding, and windings 14' and 22' into a fourth winding.

FIG. 1 illustrates storage chokes 24, 25 and 26, each arranged in a respective conductor 19, 20, and 21. These storage chokes serve to balance the instantaneous differences of power between the primary and secondary mains. For this purpose, a single choke, such as the choke 24, would be sufficient in the direct frequency changer arrangement of the invention. For reasons of symmetry, however, a choke can be provided for each partial frequency changer as shown in FIG. 1.

A symmetrical choke arrangement also can be obtained if the number of partial chokes 24, 25 and 26 provided on a common shaft is equal to the number of partial frequency changers.

An alternative arrangement is to divide each of the above-mentioned chokes or partial chokes and, instead of connecting the centers of the inner windings of the partial frequency changers through the conductors, to arrange the partial chokes between the internal primary winding and the internal secondary winding of a partial frequency changed. In accordance with FIG. 1, for example, the chokes or partial chokes 25, for example, can be replaced by two partial chokes 27 and 28. Such a measure is necessary when storage chokes must be provided, for example, in the arrangement shown in FIG. 3. The storage chokes may comprise only one winding, but they can also comprise several partial windings center tapped, if necessary.

While specific embodiments of the invention have been shown and described in detail to illustrate the application of the principles of the invention, it will be understood that the invention may be embodied otherwise without departing from such principles.

What is claimed is:

1. A direct frequency changer arrangement comprising, in combination, at least three partial symmetrical direct frequency changers having internal windings; and means, including conductors connecting said partial frequency changers in series with each other and which conductors are connected with the internal windings of the partial frequency changers.

2. A direct frequency changer arrangement, as claimed in claim 1, in which said partial symmetrical direct frequency changers are at least partly in-phase with each other.

3. A direct frequency changer arrangement, as claimed in claim 1, in which said partial symmetrical direct frequency changers are at least partly differently phased.

4. A direct frequency changer arrangement, as claimed in claim 1, in which in-phase internal winding systems at the same frequency, and whose midpoints are directly connected with each other, are combined to form a single winding system.

5. A direct frequency changer arrangement, as claimed in claim 1, including storage chokes connected in said conductors; said conductors interconnecting the midpoints of the internal windings of the partial symmetrical direct frequency changers.

6. A direct frequency changer arrangement, as claimed in claim 1, which includes internal primary winding systems and internal secondary winding systems; and at least one storage choke connected between the internal primary winding systems and the internal secondary winding systems at least of one partial symmetrical direct frequency changer.

7. A direct frequency changer arrangement, as claimed in claim 1, including plural said direct frequency changer arrangements connected in parallel with each other.

8. A direct frequency changer arrangement, as claimed in claim 1, in which each partial symmetrical direct frequency changer includes a primary internal winding and a secondary internal winding; and controllable valves interconnecting the primary internal winding of each partial frequency changer to the secondary internal winding thereof.

9. A direct frequency changer arrangement as claimed in claim 8, in which at least one partial symmetrical direct frequency changer includes a pair of partial chokes each connected between a respective opposite end of its internal secondary winding and said controllable valves.

10. A direct frequency changer arrangement, as claimed in claim 1, including a choke connected in one of said conductors.

References Cited

UNITED STATES PATENTS

| | | | |
|---|---|---|---|
| 2,721,264 | 10/1955 | Selz et al. | 321—68 XR |
| 2,825,022 | 2/1958 | Boyer et al. | 321—26 |
| 2,918,616 | 12/1959 | Diebold | 321—26 XR |
| 3,368,136 | 2/1968 | Krabbe | 321—7 |

WILLIAM M. SHOOP, Jr., Primary Examiner